3,412,092
1,1-DIPHENYL-2-METHYL-3-(2,6-DIMETHYL-MORPHOLINO)PROPANOLS
Robert Bruce Moffett, Kalamazoo, Mich., assignor to The Upjohn Company, Kalamazoo, Mich., a corporation of Michigan
No Drawing. Filed Mar. 14, 1966, Ser. No. 533,773
4 Claims. (Cl. 260—247.7)

The invention relates to new and useful chemical compounds and more particularly to 1,1-diphenyl-2-methyl-3-(2,6-dimethylmorpholino)propanols and the acid addition salts thereof.

The 1,1-diphenyl-2-methyl-3-(2,6-dimethylmorpholino) propanols of the present invention are represented by the formula:

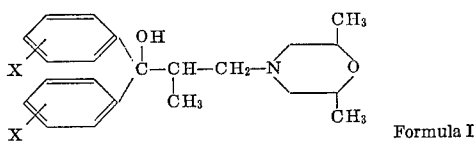
Formula I wherein X is a member selected from the group consisting of hydrogen, fluorine, chlorine, bromine, and lower-alkyl having from 1 to 4 carbon atoms, inclusive. Examples of lower-alykl having from 1 to 4 carbon atoms, inclusive, are methyl, ethyl, propyl, butyl, and isomeric forms thereof.

Compounds of the Formula I can be prepared by reacting a phenyl Grignard reagent having the formula:

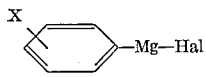

wherein X is as given above and "Hal" is halogen, preferably bromine or iodine, with a lower-alkyl 2-methyl-3-(2,6-dimethylmorpholino)proprionate (preferably a methyl or ethyl ester) in an anhydrous solvent system, e.g., diethyl ether, diisopropyl ether, dibutyl ether, tetrahydrofuran and the like; decomposing the reaction mixture in a conventional manner such as by pouring the mixture into acidified ice water, e.g., hydrobromic or hydrochloric acid, preferably containing the same anion as the "Hal" in the Grignard reagent; and collecting the acid addition salt. The free base can be obtained by dispersing the acid addition salt in water and basifying the solution, e.g., with sodium hydroxide, extracting the mixture with a water-immiscible solvent such as diethyl ether, and evaporating the extract to dryness.

Acid addition salts of compounds of the Formula I can be prepared by neutralization of the free base with the appropriate amount of an inorganic or organic acid, examples of which are hydrochloric, hydrobromic, sulfuric, nitric, phosphoric, acetic, lactic, benzoic, salicylic, glycolic, succinic, tartaric, maleic, malic, pamoic, cyclohexanesulfamic, citric and methanesulfonic acids, and like acids. The neutralization can be carried out by a variety of procedures known to the art to be generally useful for the preparation of amine acid addition salts. The choice of the most suitable procedure will depend on a variety of factors including convenience of operation, economic considerations, and particularly the solubility characteristics of the particular free base, the acid, and the acid addition salt. If the acid is soluble in water, the free base can be dissolved in water containing an equivalent amount of the acid, and thereafter, the water can be removed by evaporation; in some instances, the salt precipitates from the aqueous solution, particularly when cooled, and evaporation is not necessary. If the acid is soluble in a relatively nonpolar solvent, for example, diethyl ether or diisopropyl ether, separate solutions of the acid and free base in such a solvent can be mixed in equivalent amounts, whereupon the acid addition salt will usually precipitate because of its relatively low solubility in the non-polar solvent. Alternatively, the free base can be mixed with an equivalent amount of the acid in the presence of a solvent of moderate polarity, for example, a lower alkanol, a lower alkanone, or a lower-alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. These acid addition salts are useful for upgrading the free bases.

The compounds of Formula I in the free base form are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The fluosilicates of compounds of the Formula I (prepared by neutralizing the free bases with fluosilicic acid) are useful as mothproofing agents according to U.S. Patents 1,915,334 and 2,075,359. The thiocyanates (prepared by neutralizing the free base with thiocyanic acid) can be condensed with formaldehyde to form resinous materials useful as pickling inhibitors according to U.S. Patents 2,425,320 and 2,606,155.

The compounds of the Formula I also form salts with penicillins. These salts have solubility characteristics which cause them to be useful in the isolation and purification of penicillins, particularly benzyl penicillin. Said salts can be formed either by neutralization of the free base form of a compound of the Formula I with the free acid form of a penicillin, or by a metathetical exchange of the anion of an acid addition salt of a compound of the Formula I, for example, the chloride ion of a hydrochloride, with the anionic form of a penicillin.

The compounds of the Formula I have pharmacological activity in animals, exhibiting an anorexigenic effect, and can be used to suppress the appetite and food intake in animals. Illustratively, 1,1-diphenyl-2-methyl-3-(2,6-dimethylmorpholino)propanol inhibits food intake in dogs by 77% at a dose of 5 mg./kg. and 39% at a dose of 1 mg./kg.

The invention can be more fully understood by reference to the following examples which are given by way of illustration and not of limitation.

Example 1.—1,1-diphenyl-2-methyl-3-(2,6-dimethyl-morpholino) propanol hydrobromide To 186 ml. of 3 M phenylmagnesium bromide (0.56 mole) in absolute diethyl ether was slowly added with stirring 30.0 g. (0.14 mole) of methyl 2-methyl-3-(2,6-dimethylmorpholino)propionate (commercially available from K and K Laboratories, Inc.). After refluxing for 7 hours and standing overnight, the mixture was poured into ice water containing a slight excess of hydrobromic acid. The resulting crude hydrobromide remained insoluble and was collected by filtration, washed with water and diethyl ether and dried, giving 38.8 g. of solid, M.P. 161–164° C. This was recrystallized from 200 ml. of absolute ethanol, giving 35.6 g. of 1,1-diphenyl-2-methyl - 3 - (2,6 - dimethylmorpholino)propanol hydrobromide as crystals having a M.P. of 191–194° C. (dec.).

*Analysis.*—Calcd. for $C_{22}H_{30}BrNO_2$: C, 62.85; H, 7.19; Br, 19.01; N, 3.33. Found: C, 62.28; H, 7.80; Br, 19.32; N, 3.11

Example 2.—1,1-diphenyl-2-methyl-3-(2,6-dimethyl-morpholino)propanol

The aqueous layer from the filtrate of the crude hydrobromide of Example 1 was washed with ether, made basic with aqueous sodium hydroxide solution, and the mixture was extracted with ether. The ether extract was washed with water, then with saturated aqueous sodium chloride solution, and dried over anhydrous sodium sulfate. After filtration, the solvent was evaporated in vacuo, giving 12.4 g. of oily free base, namely, 1,1-diphenyl-2-methyl-3-(2,6-dimethylmorpholino)propanol.

Likewise, the bulk of the above hydrobromide was converted to the free base, giving 27.1 g. of syrupy 1,1-diphenyl-2-methyl-3-(2,6-dimethylmorpholino)propanol.

Example 3.—1,1-diphenyl-2-methyl-3-(2,6-dimethylmorpholino)propanol hydrochloride Each of the above fractions of free base were separately dissolved in absolute ether and acidified with ethanolic hydrogen chloride. The resulting lots of hydrochloride were each recrystallized from isopropyl alcohol, giving from the first fraction of free base 6.2 g. of 1,1-diphenyl - 2 - methyl - 3 - (2,6-dimethylmorpholino) propanol hydrochloride, M.P. 198.5–200° C. (dec.) and from the second fraction 23.9 g. of the same compound, M.P. 200–202° C (dec.).

*Analysis.*—Calcd. for $C_{22}H_{30}ClNO_2$: C, 70.28; H, 8.04; Cl, 9.43; N, 3.73. Found: C, 70.18; H, 8.26; Cl, 9.41; N, 3.93.

Following the procedure of the above Example 1, but substituting each of the following substituted-phenylmagnesium halides for the phenylmagnesium bromide used in the example:

2-chlorophenylmagnesium bromide,
3-chlorophenylmagnesium bromide,
4-chlorophenylmagnesium bromide,
3-bromophenylmagnesium bromide,
4-fluorophenylmagnesium bromide,
4-methylphenylmagnesium bromide,
2-ethylphenylmagnesium bromide,
4-isopropylphenylmagnesium bromide, and
4-sec.butylphenylmagnesium bromide, there can be respectively obtained:

1,1-bis(2-chlorophenyl)-2-methyl-3-(2,6-dimethylmorpholino)propanol hydrobromide,
1,1-bis(3-chlorophenyl)-2-methyl-3-(2,6-dimethylmorpholino)propanol hydrobromide,
1,1-bis(4-chlorophenyl)-2-methyl-3-(2,6-dimethylmorpholino)propanol hydrobromide,
1,1-bis(3-bromophenyl)-2-methyl-3-(2,6-dimethylmorpholino)propanol hydrobromide,
1,1-bis(4-fluorophenyl)-2-methyl-3-(2,6-dimethylmorpholino)propanol hydrobromide,
1,1-bis(4-methylphenyl)-2-methyl-3-(2,6-dimethylmorpholino)propanol hydrobromide,
1,1-bis(2-ethylphenyl)-2-methyl-3-(2,6-dimethylmorpholino)propanol hydrobromide,
1,1-bis(4-isopropylphenyl)-2-methyl-3-(2,6-dimethylmorpholino)propanol hydrobromide, and
1,1-bis(4-sec.butylphenyl)-2-methyl-3-(2,6-dimethylmorpholino)propanol hydrobromide.

What is claimed is:

1. A compound selected from the group consisting of compounds having the formula:

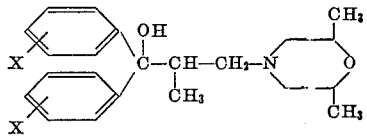

wherein X is a member selected from the group consisting of hydrogen, fluorine, chlorine, bromine, and lower-alkyl having from 1 to 4 carbon atoms, inclusive, and the acid addition salts thereof.

2. The compound of claim 1 wherein the compound is 1,1-diphenyl-2-methyl-3-(2,6 - dimethylmorpholino)propanol.

3. The compound of claim 1 wherein the compound is 1,1-diphenyl-2-methyl-3-(2,6 - dimethylmorpholino)propanol hydrochloride.

4. The compound of claim 1 wherein the compound is 1,1-diphenyl-2-methyl-3-(2,6 - dimethylmorpholino)propanol hydrobromide.

References Cited

Stelt et al.: Chemical Abstract, vol. 62, page 14,543 (1965).

Henecka et al.: Chemical Abstracts, vol. 55, page 16,452C (1961).

NICHOLAS S. RIZZO, *Primary Examiner.*

JOSE TOVAR, *Assistant Examiner.*